(12) United States Patent
Weis

(10) Patent No.: US 11,356,048 B2
(45) Date of Patent: Jun. 7, 2022

(54) SPACE VECTOR MODULATION METHOD TAKING INTO ACCOUNT MINIMUM SWITCHING STATUS TIMES FOR CONTROLLING A MULTI-PHASE ELECTRIC MACHINE

(71) Applicant: SIEMENS AKTIENGESELLSCHAFT, Munich (DE)

(72) Inventor: Benno Weis, Hemhofen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/289,134

(22) PCT Filed: Oct. 22, 2019

(86) PCT No.: PCT/EP2019/078724
§ 371 (c)(1),
(2) Date: Apr. 27, 2021

(87) PCT Pub. No.: WO2020/088991
PCT Pub. Date: May 7, 2020

(65) Prior Publication Data
US 2021/0384860 A1  Dec. 9, 2021

(30) Foreign Application Priority Data
Oct. 30, 2018 (EP) .................................. 18203379

(51) Int. Cl.
*H02P 27/08* (2006.01)
*H02M 7/5387* (2007.01)

(52) U.S. Cl.
CPC ...... *H02P 27/085* (2013.01); *H02M 7/53876* (2021.05)

(58) Field of Classification Search
CPC ................. H02P 27/085; H02M 7/53875
See application file for complete search history.

(56) References Cited

U.S. PATENT DOCUMENTS

| | | | |
|---|---|---|---|
| 5,955,862 A | 9/1999 | Nguyen Phuoc | |
| 9,048,726 B1 * | 6/2015 | Tang | H02M 1/12 |
| 9,608,545 B1 | 3/2017 | Yim et al. | |
| 2011/0062934 A1 * | 3/2011 | Wolf | H02M 7/48 323/304 |

(Continued)

OTHER PUBLICATIONS

PCT International Search Report and Written Opinion of International Searching Authority dated Feb. 13, 2020 corresponding to PCT International Application No. PCT/EP2019/078724 filed Oct. 22, 2019.

*Primary Examiner* — Rina I Duda
(74) *Attorney, Agent, or Firm* — Henry M. Feiereisen LLC

(57) ABSTRACT

A method and a converter for controlling a multi-phase electric machine are disclosed. Each phase voltage of the electric machine is generated with two electronic switches interconnected to form a half bridge. The switching statuses of the half bridges are controlled with space vector modulation. A minimum dwell time is predefined, and each switching status, represented by an active basic voltage space vector, of the half bridges is maintained at least for the minimum dwell time.

11 Claims, 2 Drawing Sheets

(56) References Cited

U.S. PATENT DOCUMENTS

| | | | |
|---|---|---|---|
| 2011/0068722 A1* | 3/2011 | Wolf | H02P 21/06 318/400.02 |
| 2016/0006367 A1* | 1/2016 | Wei | H02M 7/537 363/131 |
| 2017/0179844 A1* | 6/2017 | Schumacher | H03M 7/3082 |

* cited by examiner

SPACE VECTOR MODULATION METHOD TAKING INTO ACCOUNT MINIMUM SWITCHING STATUS TIMES FOR CONTROLLING A MULTI-PHASE ELECTRIC MACHINE

CROSS-REFERENCES TO RELATED APPLICATIONS

This application is the U.S. National Stage of international Application No. PCT/EP2019/078724, filed Oct. 22, 2019, which designated the United States and has been published as International Publication No. WO 2020/088991 A1 and which claims the priority of European Patent Application, Serial No. 18203379.5, filed Oct. 30, 2018, pursuant to 35 U.S.C. 119(a)-(d).

BACKGROUND OF THE INVENTION

The invention relates to a method and a power converter for controlling a multi-phase electric machine, wherein each phase voltage of the electric machine is generated with two electronic switches interconnected to form a half-bridge and the switching states of the half-bridges are controlled using space vector modulation.

In space vector modulation each switching state of the half-bridges is represented by a basic voltage space vector and a setpoint space vector is predetermined hi each case for successive pulse periods of the space vector modulation. In accordance with the principle of pulse width modulation by changing the basic voltage space vector within the respective pulse period, the setpoint space vector is realized as a temporal mean value over the pulse period.

Increased voltages occur between the connecting terminals of an electric machine controlled in this way using space vector modulation when two of the half-bridges are switched over in opposite directions to one another simultaneously or almost simultaneously. The space vector modulation is therefore generally realized such that a simultaneous switchover of two half-bridges in opposite directions to one another is prevented. However, an increased line-to-ground voltage also occurs at an electric machine when two half-bridges are switched over simultaneously or almost simultaneously.

U.S. Pat. No. 9,608,545 B1 discloses a method for driving a load, in which a switching signal is provided to control the switching operations of switching devices. If the switching signal falls into a specified dead zone, the switching signal is modified by moving a space vector corresponding to the switching signal to a boundary of the dead zone.

U.S. Pat. No. 5,955,862 A discloses a frequency converter for an asynchronous motor with a voltage converter which has switches controlled in accordance with pulse width modulation. If at least one of two components of an output voltage vector is less than a predetermined minimum value, two substitute vectors are calculated, the vectorial mean value of which is equal to the output voltage vector, wherein the components of a first substitute vector are each greater than the minimum value. The substitute vectors are used, for example, in two halves of a pulse period or in two successive pulse periods of the use width modulation.

The object of the invention is to specify a method and a device for the improved control of a multi-phase electric machine using space vector modulation.

SUMMARY OF THE INVENTION

The object is achieved according to the invention by a method, as set forth hereinafter, and a power converter, as set forth hereinafter.

Advantageous embodiments of the invention are the subject matter of the subclaims.

In the method according to the invention for controlling a multi-phase electric machine, each phase voltage of the electric machine is generated with two electronic switches interconnected to form a half-bridge and the switching states of the half-bridges are controlled using space vector modulation. A minimum dwell time is predetermined in this case and each switching state of the half-bridges represented by an active basic voltage space vector is maintained at least for the minimum dwell time.

The minimum dwell time prevents the duration of a switching state represented by an active basic voltage space vector from becoming so short that the switching states set before and after this switching state follow one another almost instantaneously, as a result of which two half-bridges can be switched almost simultaneously in the same way. By preventing such a switchover of the half-bridges, a line-to-ground voltage load on the electric machine is reduced. As a result, the insulation strength of the electric machine can be dimensioned to be lower and the electric machine can be better utilized by introducing less insulation material into the grooves through which coil windings of the electric machine run and using this space for the coil windings.

The invention further provides that for each pulse period of the space vector modulation a setpoint space vector is predetermined for a switching state mean value of the switching states of the half-bridges averaged over the pulse period, and that if the switching state mean value represented by the setpoint space vector cannot be realized, a switching state mean value is set which is represented by a substitute space vector hardly differing from the setpoint space vector. For example, the space vector absolute value of the substitute space vector matches the space vector absolute value of the setpoint space vector and the space vector angle of the substitute space vector differs as little as possible from the space vector angle of the setpoint space vector. Alternatively, for the formation of the substitute space vector, a duration in which the switching state of the half-bridges within the pulse period is represented by an active basic voltage space vector is reduced. In this case the duration of the active basic voltage space vector which would be used the longest within the pulse period to realize the setpoint space vector is preferably reduced.

The aforementioned embodiments of the invention take into account the fact that in consequence of the minimum dwell time predetermined for active basic voltage space vectors, not every switching state mean value represented by a setpoint space vector can be realized. In the case of an unrealized setpoint space vector, the invention provides that instead of the setpoint space vector a substitute space vector is realized which differs only slightly from the setpoint space vector.

The invention additionally provides that a differential space vector is formed between the setpoint space vector and the substitute space vector of a pulse period, and the setpoint space vector of the pulse period following the pulse period is modified as a function of the differential space vector compared to a setpoint space vector originally predetermined for the following pulse period. For example, the setpoint space vector of a pulse period is modified by the differential space vector of the previous pulse period by adding the differential space vector to the setpoint space vector originally predetermined for the pulse period. Alternatively, the setpoint space vector of a pulse period is modified by the differential space vector of the previous pulse period by rotating the differential space vector between the space vector angle of the setpoint space vector originally predetermined for the pulse period and the space vector angle of the setpoint space vector of the previous pulse period, and adding the rotated differential space vector to the setpoint space vector originally predetermined for the pulse period.

The aforementioned embodiments of the invention enable a setpoint value deviation of a voltage-time area which is caused in a pulse period by the use of a substitute space vector instead of the setpoint space vector to be offset in a subsequent pulse period by modifying the setpoint value vector of the following pulse period as a function of the deviation of the substitute space vector from the setpoint space vector.

A further embodiment of the invention provides that at least twice a duration between a switching state change of a switching state of the half-bridges and the phase voltage change of the phase voltages of the electric machine generated by the switching state change is predetermined as a minimum dwell time. This duration is for example a signal propagation time of a signal in a connection cable which connects the electric machine to a power converter comprising the half-bridges.

Alternatively to the aforementioned embodiment of the invention, the reciprocal value of a resonance frequency of the electric machine dependent on a longitudinal inductance and a winding capacitance of the electric machine is predetermined as the minimum dwell time.

The two aforementioned embodiments of the invention advantageously match the minimum dwell time to the physical properties of the electric machine and its coupling to the half-bridges. Matching the minimum dwell time to the resonance frequency of the electric machine has the advantage in particular that as a result a voltage load at a neutral point of the electric machine can also be reduced.

A further embodiment of the invention provides that each two successive switching states of the haft-bridges differ from one another only by the switch positions of precisely one half-bridge. As a result, voltage loads due to a simultaneous switchover of two or more half-bridges are advantageously prevented.

A further embodiment of the invention provides that a minimum switch position time is predetermined and a switch position of each half-bridge is maintained at least for the minimum switch position time. As a result, voltage loads due to rapid changes in the phase voltages of individual phases are advantageously prevented.

In a further embodiment of the invention, the method according to the invention is activated only if the electric machine is operated with phase voltages, the amplitudes of which lie in a predetermined voltage range. In this case a voltage range is predetermined for the activation of the method in which the electric machine is exposed to a voltage load for which it is not designed in a control method using conventional space vector modulation. In the case of phase voltages outside this voltage range the electric machine is in contrast preferably controlled using conventional space vector modulation. This takes into account the fact that with the space vector modulation modified in accordance with the invention, a ripple current in the electric machine increases slightly compared to conventional space vector modulation, such that the space vector modulation modified in accordance with the invention is advantageous compared to conventional space vector modulation only for voltage loads of the electric machine for which it is not designed in the case of a control method using conventional space vector modulation.

A power converter according to the invention for performing the method according to the invention comprises for each phase voltage two electronic switches interconnected to form a half-bridge and a control unit for controlling the electronic switches in accordance with the method according to the invention. The advantages of a power converter such as this correspond to the aforementioned advantages of the method according to the invention.

BRIEF DESCRIPTION OF THE DRAWING

The above-described characteristics, features and advantages of this invention, as well as the manner in which these are realized, will become more clearly and easily intelligible in connection with the following description of exemplary embodiments which are explained in more detail with reference to the drawings, in which.

DETAILED DESCRIPTION OF PREFERRED EMBODIMENTS

Figure 1:
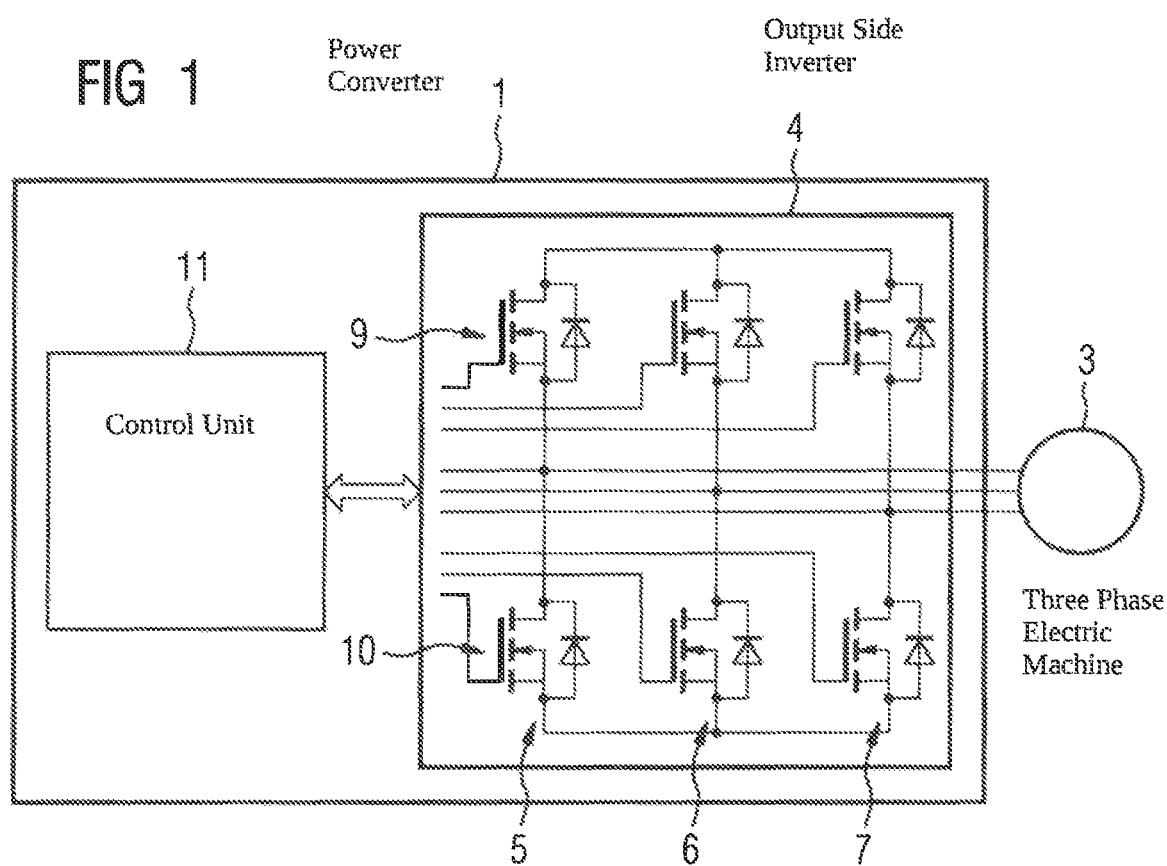
FIG. 1 shows a block diagram of a power converter and an electric machine operated at the power converter.

Parts which correspond to one another are provided with the same reference characters in the figures.

FIG. 1 shows a block diagram of a power converter 1 and a three-phase electric machine 3 operated at the power converter 1. The electric machine 3 is for example designed as a brushless DC motor. The power converter 1 comprises an output-side inverter 4 which has an electric half-bridge 5, 6, 7 for each phase of the electric machine 3, in both bridge arms of which an electronic switch 9, 10 is arranged in each case and the bridge arm of which is connected to a coil winding of the respective phase of the electric machine 3. On the input side the power converter 1 has a rectifier (not shown here) which is connected to the inverter 4 via a DC link (likewise not shown here). Each electronic switch 9, 10 is embodied as a MOSFET (metal-oxide-semiconductor field-effect transistor), but alternatively can also be embodied for example as an IGBT (insulated gate bipolar transistor). Furthermore, the power converter 1 has a control unit 11 for controlling the electronic switches 9, 10 according to the method described in greater detail on the basis of FIGS. 2 to 4.

Figure 2:
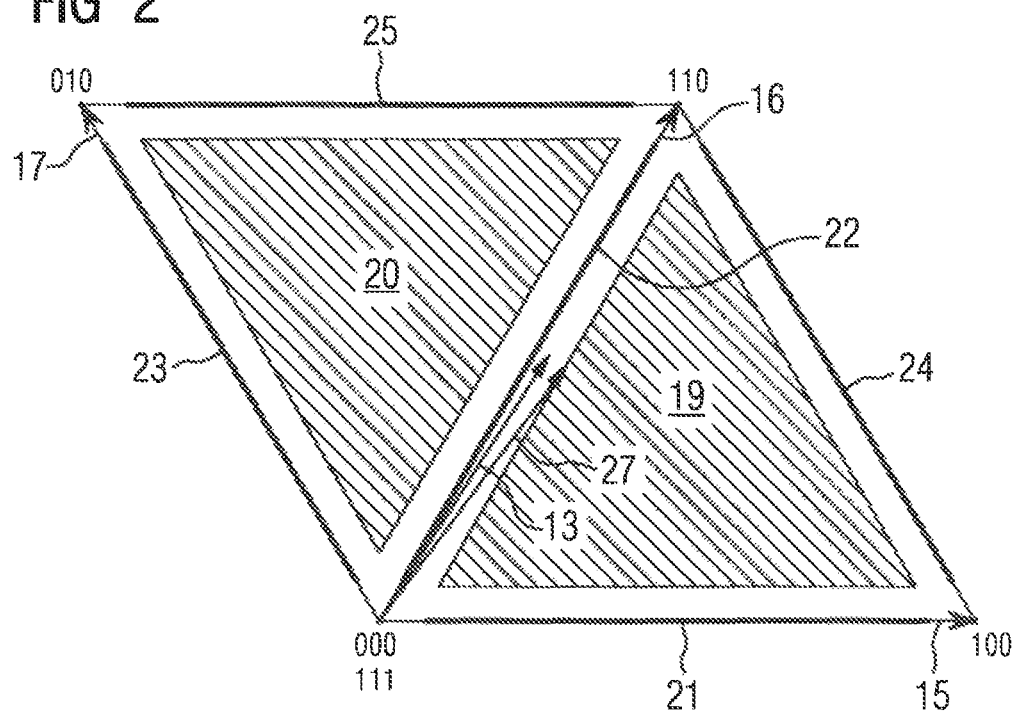
FIG. 2 shows a cutout of a space vector plane with a setpoint space vector and basic voltage space vectors.

FIG. 2 shows a cutout of a space vector plane with a setpoint space vector 13 and basic voltage space vectors 15, 16, 17. Each basic voltage space vector 15, 16, 17 represents a switching state of the half-bridges 5, 6, 7, which is represented by a digit triplet, the three digits of which can each assume the values 0 or 1 and are each assigned to a half-bridge 5, 6, 7. The value 1 of a digit of the digit triplet stands for a switch position of the half-bridge 5, 6, 7 assigned to this digit, in which a first electronic switch 9 of the half-bridge 5, 6, 7 is switched on and the second electronic switch 10 is switched off, whereby the coil winding of the electric machine 3 connected to the half bridge 6, 6, 7 is placed onto a positive electrical potential of the DC link of the power converter 1. The value 0 of a digit of the digit triplet stands for a switch position of the half-bridge 5, 6, 7 assigned to this digit, in which the first electronic switch 9 of half-bridge 5, 6, 7 is switched off and the second electronic switch 10 is switched on, as a result of which the coil winding of the electric machine 3 connected to the half bridge 5, 6, 7 is placed onto a negative electrical potential of the DC link of the power converter 1. The basic voltage space vectors, which represent a switching state indicated by one of the digit triplets 100, 010, 001, 110, 101 or 011 are designated as active basic voltage space vectors. The two basic voltage space vectors, which represent a switching state indicated by one of the digit triplets 000 or 111, are designated as passive basic voltage space vectors or zero voltage space vectors.

According to the invention, the switching states of the half-bridges 5, 6, 7 are controlled using space vector modulation with a pulse period. In this case, as usual, a setpoint space vector 13 for the switching state mean value of the switch states of the half-bridges 5, 6, 7 averaged over the pulse period is predetermined for each pulse period, wherein in the pulse period a switch is made between switching states represented by the two active basic voltage space vectors 16, 16, 17 to the setpoint space vector 13 and the two zero voltage space vectors or a subset of these space vectors.

In contrast to conventional space vector modulation, however, a minimum dwell time is predetermined and each switching state of the half-bridges 5, 6, 7 represented by an active basic voltage space vector 15, 16, 17 is maintained at least for the minimum dwell time. Furthermore, a minimum switch position time is predetermined and a switch position of each half-bridge 5, 6, 7 is maintained at least for the minimum switch position time. Furthermore, the switching states of the half-bridges 5, 6, 7 are only changed such that every two successive switching states of the half-bridges 5, 6, 7 only differ from one another by the switch positions of precisely one half-bridge 5, 6, 7.

With these specifications, not every switching state mean value represented by a setpoint space vector 13 can be realized, since the minimum dwell time for switching states of the half-bridges 5, 6, 7 represented by active basic voltage space vectors 15, 16, 17 and the minimum switch position time for the switch positions of each half-bridge 5, 6, 7 must be observed. In FIG. 2, in the cutout of the space vector plane shown, regions are indicated, the points of which represent realizable switching state mean values. These are triangular areas 19, 20 between the active basic voltage space vectors 15 and 16 or 16 and 17, the points represented by the digit triplets 100, 110, 010 and 000 (or 111), and lines 21 to 25, which run between these points. In contrast, the points of a region lying between a triangular area 19, 20 and the lines 21 to 25 adjacent thereto represent none realizable switching state mean values.

A switching state mean value represented by a point in the triangular area 19 is for example realized within a pulse period by a temporal switching state sequence 000→100→110→111→110→100→000. A switching state mean value represented by a point on the line 22 is for example realized within a pulse period by a change between the switching states 110 and 111. A switching state mean value represented by a point on the line 24 is for example realized within a pulse period by a temporal switching state sequence 100→110→100. The same applies for the other realizable switching state mean values. A setpoint space vector 13 with the space vector absolute value zero is realized by setting the same zero voltage space vector over the entire pulse period.

The minimum dwell time is for example predetermined as at least twice a duration between a switching state change of a switching state of the half-bridges 5, 6, 7 and the phase voltage change of the phase voltages of the electric machine 3 generated by the switching state change. This duration is for example a signal propagation time of a signal in a connection cable connecting the power converter 1 to the electric machine 3 from the half bridges 5, 6, 7 to connecting terminals of the electric machine 3.

Alternatively, the reciprocal value of a resonance frequency of the electric machine 3 that is dependent on a longitudinal inductance and a winding capacitance of the electric machine 3 is predetermined as the minimum dwell time.

In FIG. 2, a setpoint space vector 13 is shown, which represents a non-realizable switching state mean value, since to realize this the switching state 100 would only have to be set for a very short time within a pulse period, whereby in accordance with the above switching state sequence in the triangular area 19 an almost instantaneous switching state change would occur between the switching states 000 and 110 and thus two half-bridges 5, 6, 7 would be switched over almost simultaneously in the same way. In a case such as this, a switching state mean value is set which is represented by a substitute vector 27 hardly differing from the setpoint space vector 13. In the example shown in FIG. 2, the space vector absolute value of the substitute vector 27 corresponds to the space vector absolute value of the setpoint space vector 13 and the space vector angle of the substitute space vector 27 differs as little as possible from the space vector angle of the setpoint space vector 13. Alternatively, to form the substitute space vector 27 a duration in which the switching state of the half bridges 5, 6, 7 within the pulse period is represented by one of the active basic voltage space vectors 15, 16, 17 is reduced. In this case, the duration of the active basic voltage space vector 15, 16, 17 that would be used the longest within the pulse period for realizing the setpoint space vector 13 is preferably reduced.

Figure 3:
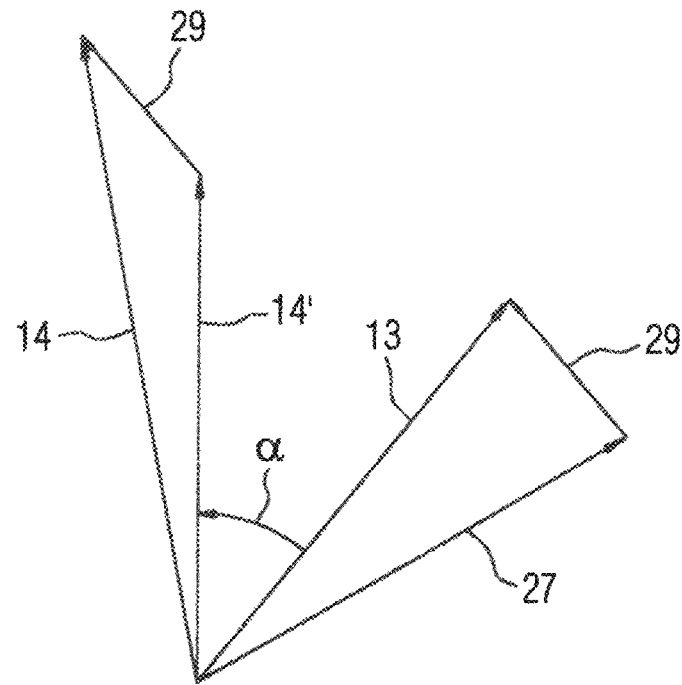
FIG. 3 shows setpoint space vectors of successive pulse periods of space vector modulation formed according to a first embodiment variant of the invention.
Figure 4:
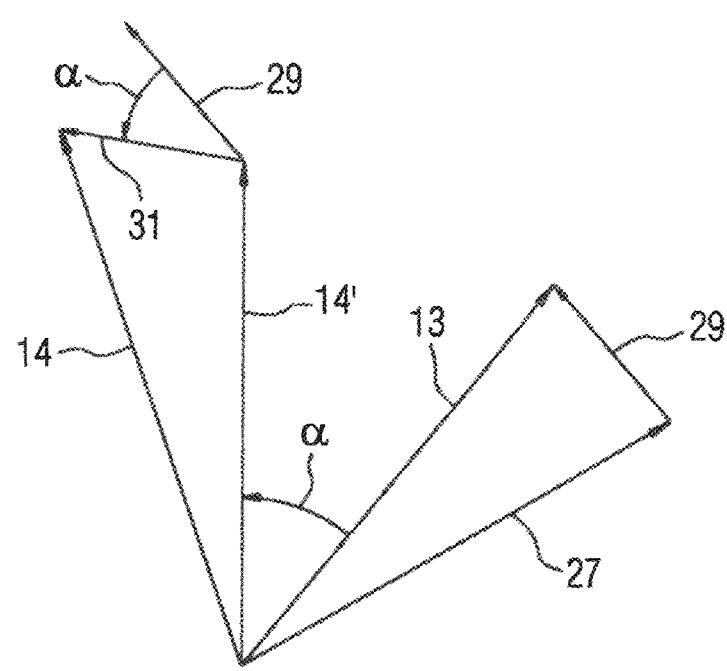
FIG. 4 shows setpoint space vectors of successive pulse periods of space vector modulation formed according to a second embodiment variant of the invention.

FIGS. 3 and 4 show two different embodiment variants of the invention, according to which a setpoint space vector 14 of a pulse period of the space vector modulation is formed if in the previous pulse period a substitute space vector 27 differing from the setpoint space vector 13 of the previous pulse period was used to form the switching state mean value of the switching states of the half-bridges 5, 6, 7. In both embodiment variants, a differential space vector 29 is formed between the setpoint space vector 13 and the substitute space vector 27 of the previous pulse period, and the setpoint space vector 14 is modified compared to the originally predetermined setpoint space vector 14' as a function of the differential space vector 29 of the previous pulse period in order to offset a deviation of the voltage-time area from its setpoint value caused in the previous pulse period by the use of the substitute space vector 27 instead of the setpoint space vector 13.

In the formation of the setpoint space vector 14 shown in FIG. 3, the differential space vector 29 of the previous pulse period is added to the originally predetermined setpoint space vector 14'.

In the formation of the setpoint space vector 14 shown in FIG. 4, the differential space vector 29 is rotated by a differential angle α between the space vector angle of the setpoint space vector 14' originally predetermined for the pulse period and the space vector angle of the setpoint space vector 13 of the previous pulse period, and the rotated differential space vector 31 is added to the setpoint space vector 14' originally predetermined for the pulse period.

The method described above on the basis of FIGS. 2 to 4 is preferably activated, for example by means of a parameter for the power converter 1, only when the electric machine 3 is operated with phase voltages, the amplitudes of which lie in a predetermined voltage range. In this case, to activate the method a voltage range is predetermined in which the electric machine 3 is exposed to a voltage load for which it is not designed in a control method using conventional space vector modulation. In the case of phase voltages outside this voltage range, the electric machine 3 is in contrast controlled using conventional space vector modulation. This takes into account the fact that in the case of the space vector modulation modified according to the invention, a ripple current in the electric machine 3 increases slightly compared to conventional space vector modulation, such that compared to conventional space vector modulation the space vector modulation modified according to the invention is advantageous only when the electric machine 3 is subjected to voltage loads for which it is not designed in a control method using conventional space vector modulation.

Although the invention has been illustrated and described in detail based on preferred exemplary embodiments, the invention is not restricted by the examples given and other variations can be derived therefrom by a person skilled in the art without departing from the protective scope of the invention.

What is claimed is:

1. A method for controlling a multi-phase electric machine, said method comprising:
   generating each phase voltage of the electric machine with two electronic switches interconnected to form a half-bridge;
   controlling switching states of the half-bridges using space vector modulation;
   maintaining each switching state of the half-bridges represented by an active basic voltage space vector that is different from a zero voltage space vector for at least a predetermined minimum dwell time;
   specifying for each pulse period of the space vector modulation a setpoint space vector for a switching state mean value of the switching states of the half bridges averaged over the pulse period;
   setting a switching state mean value which is represented by a substitute space vector differing from the setpoint space vector when the switching state mean value represented by the setpoint space vector cannot be realized;
   forming a differential space vector between the setpoint space vector and the substitute space vector of the pulse period; and
   modifying the setpoint space vector of the pulse period following the pulse period as a function of the differential space vector compared to a setpoint space vector originally predetermined for the following pulse period.

2. The method of claim 1, wherein a space vector absolute value of the substitute space vector matches a space vector absolute value of the setpoint space vector and a space vector angle of the substitute vector differs from a space vector angle of the setpoint space vector.

3. The method of claim 1, further comprising representing a duration in which the switching state of the half-bridges within the pulse period by one of the active basic voltage space vectors is reduced to form the substitute space vector.

4. The method of claim 1, further comprising modifying the setpoint space vector of the pulse period by the differential space vector of the previous pulse period by adding the differential space vector to the setpoint space vector originally predetermined for the pulse period.

5. The method of claim 1, further comprising modifying the setpoint space vector of the pulse period by the differential space vector of the previous pulse period by rotating the differential space vector about a differential angle between a space vector angle of the setpoint space vector originally predetermined for the pulse period and a space vector angle of the setpoint space vector of the previous pulse period and adding the rotated differential space vector to the setpoint space vector originally predetermined for the pulse period.

6. The method of claim 1, further comprising predetermining as the minimum dwell time at least twice a duration between a switching state change of a switching state of the half-bridges and a phase voltage change of the phase voltages of the electric machine generated by the switching state change.

7. The method of claim 1, further comprising predetermining as the minimum dwell time a reciprocal value of a resonance frequency of the electric machine dependent on a longitudinal inductance and a winding capacitance of the electric machine.

8. The method of claim 1, wherein each two successive switching states of the half-bridges differ from one another only by switch positions of precisely one half-bridge.

9. The method of claim 1, further comprising:
   predetermining a minimum switch position time; and
   maintaining a switch position of each half-bridge at least for the minimum switch position time.

10. The method of claim 1, wherein the method is activated when the electric machine is operated with phase voltages, amplitudes of which lie in a predetermined voltage range.

11. A power converter for controlling a multi-phase electric machine, said power converter comprising:
    two electronic switches interconnected to form a half-bridge for each phase voltage; and
    a control unit configured to
       generate each phase voltage of the electric machine with the two electronic switches interconnected to form the half-bridge;
       control switching states of the half-bridges using space vector modulation;
       maintain each switching state of the half-bridges represented by an active basic voltage space vector that is different from a zero voltage space vector for at least a predetermined minimum dwell time;
       specify for each pulse period of the space vector modulation a setpoint space vector for a switching state mean value of the switching states of the half bridges averaged over the pulse period;
       set a switching state mean value which is represented by a substitute space vector differing from the setpoint space vector when the switching state mean value represented by the setpoint space vector cannot be realized;
       form a differential space vector between the setpoint space vector and the substitute space vector of the pulse period; and
       modify the setpoint space vector of the pulse period following the pulse period as a function of the differential space vector compared to a setpoint space vector originally predetermined for the following pulse period.

* * * * *